Figure 1:
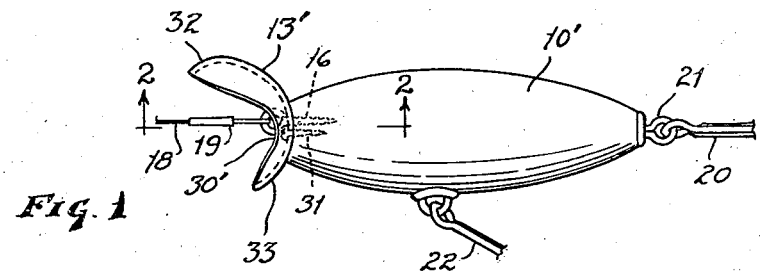

Aug. 14, 1945.  C. WOOD  2,382,595
FISH LURE
Original Filed Aug. 13, 1942

INVENTOR.
Conrad Wood
BY
ATTORNEY.

Patented Aug. 14, 1945

2,382,595

UNITED STATES PATENT OFFICE 2,382,595

FISH LURE

Conrad Wood, El Dorado, Ark., assignor to The American Fork & Hoe Company, Cleveland, Ohio, a corporation of Ohio Original application August 13, 1942, Serial No. 454,735. Divided and this application June 17, 1943, Serial No. 491,244

2 Claims. (Cl. 43—46)

My invention relates to artificial lures and relates more particularly to that type of artificial lures commonly called "surface" lures.

It is an object of my invention to provide a surface lure of the type referred to which when drawn through the water will have a movement which is attractive to fish.

Another object of my invention is to provide a lure of the type referred to wherein any tendency of the lure to dive is overcome, the lure operating as a skimming surface lure.

The present application is a division of my previously filed application for "Fishing lure," Serial No. 454,735, filed August 13, 1942.

Other objects of my invention and the invention itself will become more apparent by reference to the accompanying drawing and the following description.

Figure 2:
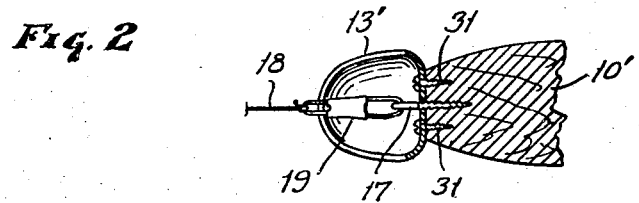

In the drawing:

Fig. 1 is a side elevational view of a fish lure constructed in accordance with my invention; and Fig. 2 is a sectional view of the lure taken on the line 2—2 of Fig. 1.

In the form of my invention shown in Figs. 1 and 2, a body portion 10' preferably formed of wood and shaped generally to resemble a small fish is shown. Secured to such body portion adjacent its forward leading edge is a gaping outwardly protruding mouth portion 13' having a hood or visor portion 32 and a lower jaw portion 33, the same being preferably formed of a single piece of metal which is contorted or bent to the form shown in the figures herein, and secured to said body portion 10' by means of screws threaded into said body portion, as shown at 31.

Screw means 16 provided with an eyelet 17 is anchored within the body 10' of the lure adjacent to its forward leading edge by being threaded through the mouth portion 13' and the body portion 10'. A pair of screws 31—31 further secure the metal mouth 13' to the body portion. A lead line 18 may be affixed to said lure by means of said eye 17 in the manner shown in the figures hereof by a fastening member 19 secured to both the lead line and the eye.

Gang hooks 20, partially shown herein, are swivelably secured to said lure by an eyelet 21 disposed adjacent the rear or tail portion 12 of the lure and gang hooks 22 are suspended in a similar manner beneath the central portion of the lure on the underside thereof, said hooks being swivelably movable with respect to said lure.

It is to be noted that the said hood or bill portion 32 is disposed a substantial distance forwardly of the lower jaw portion 33 of the lure as well as of the remainder of the lure body and that said hood extends generally upwardly of said body.

Further, said bill portion 32 is generally formed inwardly and laterally concaved, as shown in Figs. 1 and 2, whereby a generally arcuate hollowed-out portion is provided by said bill portion 32 within which water may be received and such bill portion is effective because of its formation and its length to ride on top of the water, breasting the same and acting always as a surface lure.

The lower jaw portion 33 which is shorter than the bill portion is also provided with an arcuate depressed portion and this said depressed portion forms a continuation of the arcuate hollowed-out portion of the bill portion whereby an open inwardly concaved gaping mouth is provided.

In use, the lure assumes a horizontal position in the water by means of a pull on the line, the long bill acting to keep the lure on top of the water; then, on being drawn through the water, the lure has a side-to-side movement and a slight rocking movement, the water entering the mouth being sprayed out of the side edges 30'. This rocking and spraying action has been found most attractive to fish.

Having described herein the preferred embodiments of my invention, it is to be understood that numerous and extensive departures may be made therefrom without departing from the spirit of my invention and the scope of the appended claims.

I claim:

1. An artificial bait including a generally elliptical body portion, a separately formed hood constituting a forwardly disposed mouth portion for said body portion, said mouth portion being secured to the center portion of the more forwardly disposed portion of said body and comprising a bill portion extending upwardly and outwardly from the uppermost portion of the forward end of said body portion and a lower jaw portion extending downwardly and outwardly from said body portion, said bill and jaw portions being inwardly and laterally concaved.

2. An artificial bait including a body portion, a forwardly disposed mouth portion, said mouth portion being secured to the substantially center portion of the more forwardly disposed portion of said body and comprising a bill portion extending upwardly and outwardly from said body portion and a lower jaw portion extending downwardly and outwardly from said body portion, said bill and jaw portions being inwardly and laterally concaved, said bill portion being of substantially greater length than said lower jaw portion and adapted to ride on top of the water when the bait is in operative use.

CONRAD WOOD.